(12) United States Patent
Fukuda et al.

(10) Patent No.: US 7,922,192 B2
(45) Date of Patent: Apr. 12, 2011

(54) SIDE CURTAIN AIR BAG

(75) Inventors: Masataka Fukuda, Ibaraki (JP);
Takayuki Makioka, Ibaraki (JP);
Makoto Higano, Ibaraki (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/702,643

(22) Filed: Feb. 9, 2010

(65) Prior Publication Data

US 2010/0133795 A1 Jun. 3, 2010

Related U.S. Application Data

(62) Division of application No. 10/577,372, filed as application No. PCT/JP2004/015912 on Oct. 27, 2004, now Pat. No. 7,712,768.

(30) Foreign Application Priority Data

Oct. 27, 2003 (JP) .................. 2003-366237

(51) Int. Cl.
*B60R 21/16* (2006.01)
(52) U.S. Cl. .................................. 280/730.2
(58) Field of Classification Search ............ 280/729, 280/730.2, 743.2, 749
See application file for complete search history.

(56) References Cited

U.S. PATENT DOCUMENTS

| | | | |
|---|---|---|---|
| 6,010,149 A | 1/2000 | Riedel et al. | |
| 6,168,191 B1 * | 1/2001 | Webber et al. | ............. 280/730.2 |
| 6,170,860 B1 | 1/2001 | Denz et al. | |
| 6,199,898 B1 * | 3/2001 | Masuda et al. | ............. 280/730.2 |
| 6,203,058 B1 | 3/2001 | Elgadah et al. | |
| 6,273,456 B1 | 8/2001 | Heigl | |
| 6,273,457 B1 | 8/2001 | Fischer | |
| 6,276,712 B1 | 8/2001 | Welch et al. | |
| 6,290,253 B1 | 9/2001 | Tietze et al. | |
| 6,293,581 B1 | 9/2001 | Saito | |
| 6,343,811 B1 | 2/2002 | Hammer et al. | |
| 6,361,071 B1 | 3/2002 | Denz et al. | |
| 6,394,487 B1 | 5/2002 | Heudorfer et al. | |
| 6,450,527 B2 | 9/2002 | Kobayashi et al. | |
| 6,450,529 B1 | 9/2002 | Kalandek | |
| 6,454,298 B1 * | 9/2002 | Hardig et al. | ............. 280/730.2 |
| 6,464,250 B1 | 10/2002 | Faigle | |
| 6,527,296 B2 | 3/2003 | Bakhsh et al. | |
| 6,672,612 B2 | 1/2004 | Sauer et al. | |
| 6,758,490 B2 | 7/2004 | Hoeft et al. | |
| 6,820,893 B2 | 11/2004 | Tanase et al. | |
| 7,025,375 B2 | 4/2006 | Drossler et al. | |

(Continued)

FOREIGN PATENT DOCUMENTS

DE 19939618 A1 8/1999

(Continued)

*Primary Examiner* — Paul N Dickson
*Assistant Examiner* — Robert A Coker
(74) *Attorney, Agent, or Firm* — Brinks Hofer Gilson & Lione (57) ABSTRACT

The present invention provides a side curtain air bag facilitating the control of tension with the air bag. The side curtain air bag includes chambers expanded by gas supplied from a gas generator, and expands and develops into a curtain shape along a side part of a vehicle so as to protect vehicle occupants. The side curtain air bag includes primary chambers which expand to form the side curtain air bag, and a secondary chamber which expands after the primary chambers to apply additional tension across the expanded side curtain air bag. The secondary chamber includes an opening communicating with the primary chamber.

18 Claims, 10 Drawing Sheets

U.S. PATENT DOCUMENTS

| | | |
|---|---|---|
| 2001/0019201 A1 | 9/2001 | Masuda |
| 2002/0014762 A1 | 2/2002 | Bakhsh et al. |
| 2002/0020991 A1 | 2/2002 | Tanase |
| 2002/0105174 A1 | 8/2002 | Tanase |
| 2003/0107204 A1 | 6/2003 | Drossler et al. |
| 2006/0012156 A1 * | 1/2006 | Boxey ................. 280/730.2 |

FOREIGN PATENT DOCUMENTS

| | | |
|---|---|---|
| EP | 1228930 A2 | 8/2002 |
| GB | 2327066 | 1/1999 |
| JP | 11-91492 (A) | 8/1989 |
| JP | 2002-200959 | 7/2000 |
| JP | 2000-335356 | 12/2000 |
| JP | 2000355261 | 12/2000 |
| JP | 2001233155 | 8/2001 |
| JP | 2001270413 | 10/2001 |
| JP | 2001328503 | 11/2001 |
| JP | 2000052908 | 2/2002 |
| JP | 2002503581 | 2/2002 |
| JP | 2002114125 | 4/2002 |
| JP | 2002522287 | 7/2002 |
| JP | 2002283949 | 10/2002 |
| JP | 2002-321586 | 11/2002 |
| JP | 2002542093 | 12/2002 |
| JP | 2003320920 | 11/2003 |
| JP | 2003320920 A * | 11/2003 |
| WO | WO 99/42333 | 8/1999 |
| WO | WO 00/07854 | 2/2000 |

* cited by examiner

SIDE CURTAIN AIR BAG

CROSS REFERENCE TO RELATED APPLICATIONS

This is a divisional application of and claims priority to U.S. patent application Ser. No. 10/577,372 filed Apr. 27, 2006, which claims priority to Japanese patent application serial number 2003-366237 filed Oct. 27, 2003, and PCT/JP2004/015912 filed Oct. 27, 2004.

BACKGROUND

1. Field of the Invention

The present invention relates to a side curtain air bag which is designed to protect a head of an occupant inside a vehicle by being expanded and developed during lateral collisions or turnover accidents, and to prevent the occupant from being thrown out of the vehicle.

2. Description of Related Art

Figure 8:
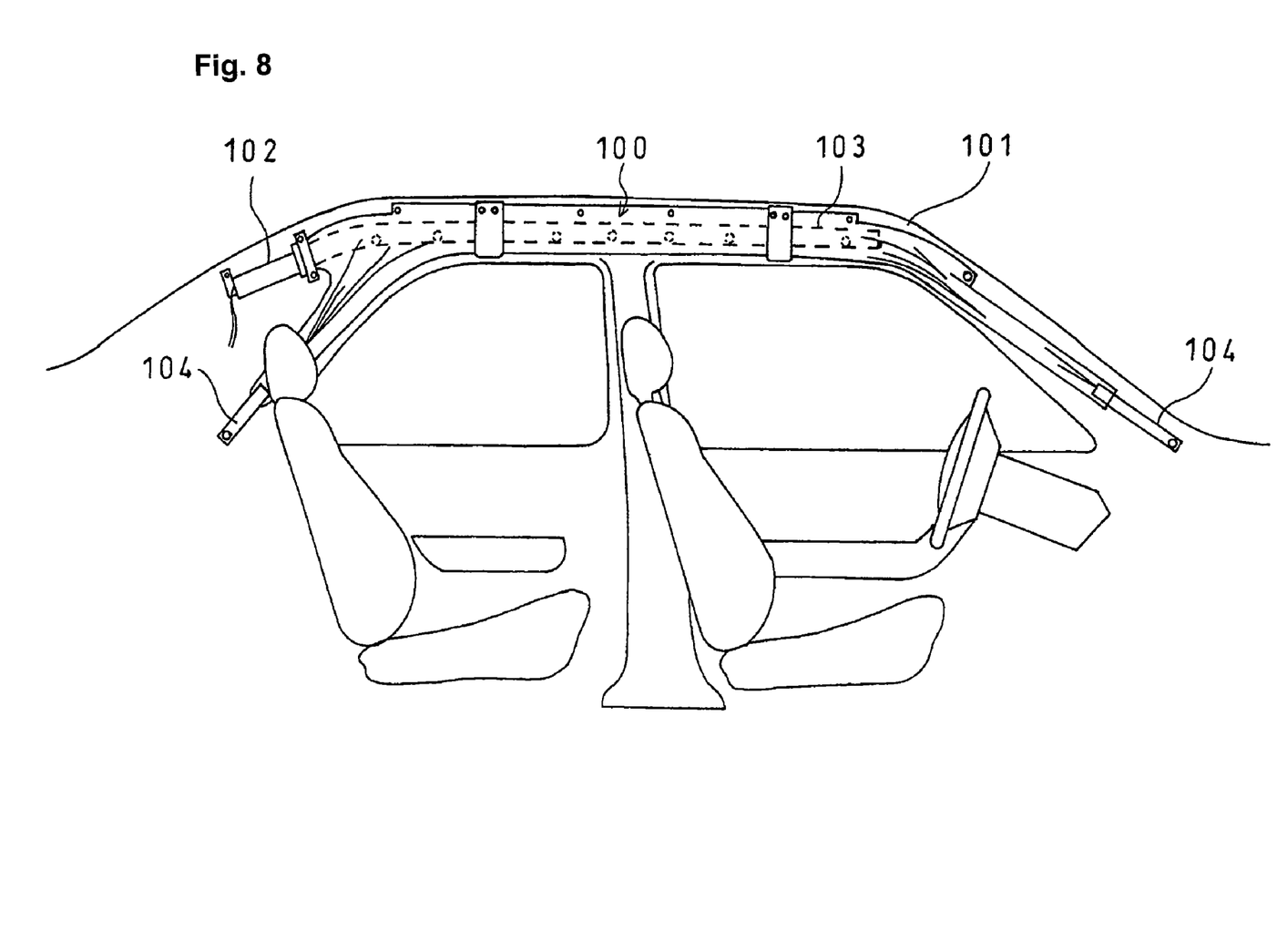
FIG. 8 is a view showing a side curtain air bag module according to the related art.
Figure 9:
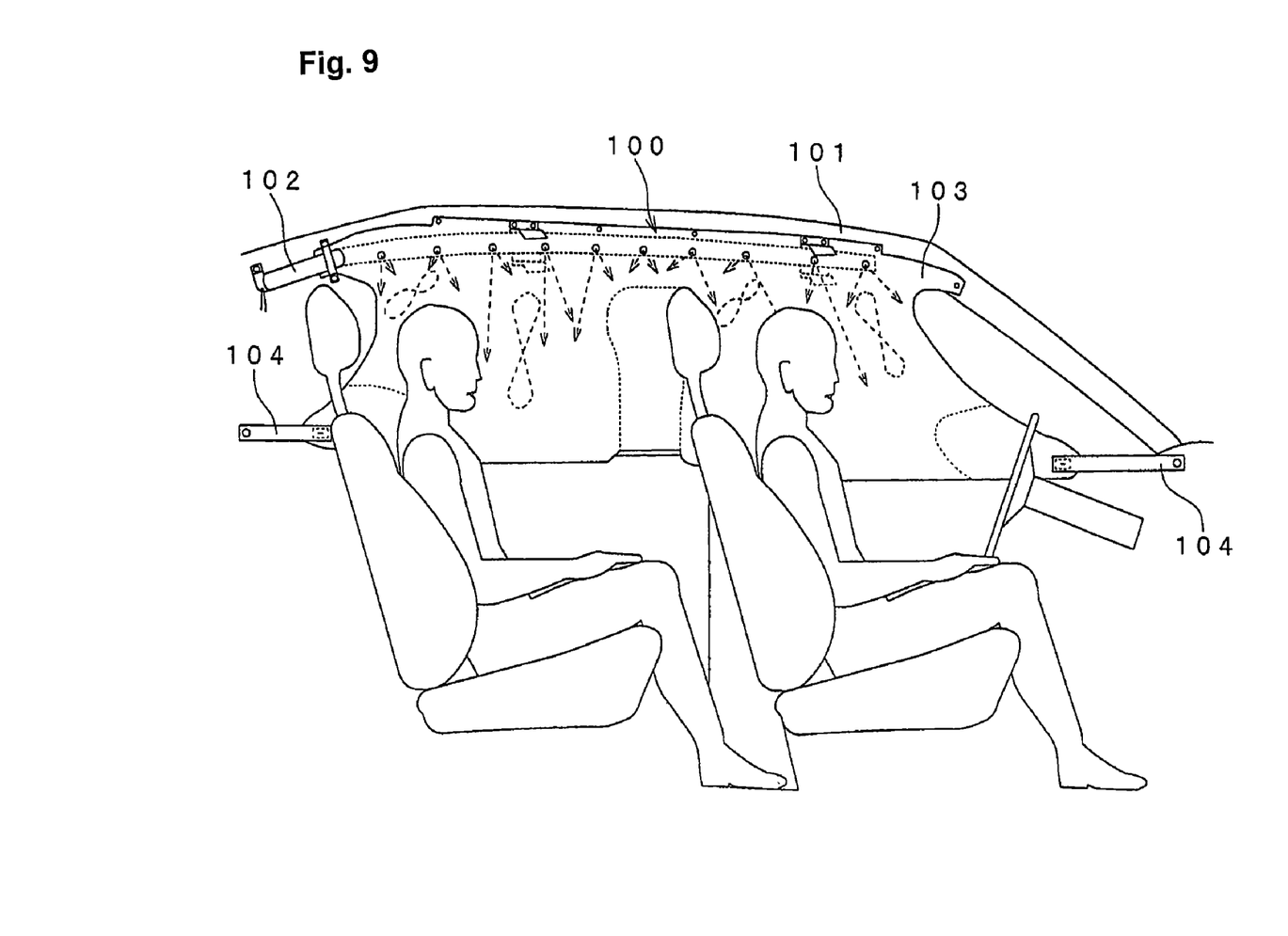
FIG. 9 is an explanatory view showing an operation of a side curtain bag module according to the related art.

In existing side curtain air bags, a side curtain air bag module 100, as shown in FIG. 8, is attached along a roof side rail 101 inside a vehicle. At the time of a collision, as shown in FIG. 9, an air bag 103 included in the side curtain air bag module 100 expands and develops into a curtain shape between an occupant and a side component in a vehicle, such as a door, by gas supplied from a gas generator 102, so as to protect the occupant from the side component.

The air bag 103 starts to expand and develop at the initial stage of the collision and comes into protective contact with the head of the occupant. Therefore, when the air bag expands, if the expansive force of the air bag 103 is excessively high and makes the air bag 103 too hard, the expansive force may harm rather than protect the occupant. Accordingly, the expansive force of the air bag is preferred to be relatively low and soft at the initial stage of the collision, when the air bag expands and develops.

In the meantime, at the latter stage of the collision, in order to prevent an occupant from being thrown out the vehicle if it overturns during the collision, the air bag 103 needs to have a relatively high tension. This is necessary to maintain an expanded position along a full forward and backward direction in a curtain shape, to prevent the occupant from being thrown out of the vehicle. For this reason, a tether 104 is attached to the leading and trailing sides below the air bag 103 to keep the air bag 103 in the expanded position. One end of the tether 104 is attached to the air bag 103, and the other end thereof is attached to a chassis.

However, in the related art air bag 103 the tension set by the tether 104 is high as soon as the air bag starts to expand and develop. Therefore, in the prior art it is difficult to make the tension across the air bag low when the air bag initially starts to expand and develop, and become high when the air bag is developed.

In view of the above, it is apparent that there exists a need for an air bag which is capable of controlling the tension across the air bag during initial expansion and after full expansion.

SUMMARY

In satisfying the above need, as well as overcoming the enumerated drawbacks and other limitations of the related art, the present invention provides a side curtain air bag which has chambers expanded by gas supplied from a gas generator, and expands and develops into a curtain shape along a side part of a vehicle so as to protect vehicle occupants.

Further, the side curtain air bag includes primary chambers which expand to form the side curtain air bag; and a secondary chamber which expands later than the primary chambers to apply an additional tension across the developed side curtain air bag.

Furthermore, the secondary chamber may have an opening communicating with the primary chamber, and may be expanded by an inflow of the gas from the primary chamber.

According to a second embodiment of the invention, the side curtain air bag includes chambers expanded by gas supplied from the gas generator, and expands and develops into a curtain shape along the side part of the vehicle so as to protect the vehicle occupants. The side curtain air bag includes a primary chamber which expands so as to protect an occupant; a secondary chamber which applies tension on the side curtain air bag after the side curtain air bag is expanded and developed; and a set of tethers, each tether having one end attached to the side curtain air bag at a joint end and the other end attached to a vehicle at a fixation end in the forward and backward direction of the vehicle. In this case, when the side curtain air bag expands and develops, the secondary chamber is disposed such that a portion or all of the secondary chamber overlaps a virtual band, the virtual band being defined by a first virtual line connecting the respective fixation ends of the one pair of tethers and a second virtual line connecting the respective joint ends of the one pair of tethers.

The secondary chamber may expand later than the primary chamber.

In addition, the secondary chamber may have an opening communicating with the primary chamber, and may be expanded by the inflow of the gas from the primary chamber.

According to a third aspect of the invention, there is provided a side curtain air bag which has chambers expanded by gas supplied from an inflator, and expands and develops in a curtain shape at side part of a vehicle so as to protect occupants. The side curtain air bag includes a primary chamber which expands so as to protect an occupant; a secondary chamber which applies tension on the side curtain air bag after the side curtain air bag is expanded and developed; and a set of strings, each having one end attached to the side curtain air bag at a joint end via an attachment part of the side curtain air bag and the other end attached to a vehicle at a fixation end, in the forward and backward direction of the vehicle. In this case, when the side curtain air bag expands and develops, the secondary chamber is disposed such that a portion or all of the secondary chamber overlaps an alternate virtual band, the alternate virtual band being defined by a first virtual line connecting respective upper ends of attachment points of the one pair of tethers and a second virtual line connecting respective lower ends of the attachment points of the one pair of tethers.

As above, the secondary chamber may expand later than the primary chamber, and it may include, an opening communicating with the primary chamber, such that the secondary chamber may be expanded by the inflow of the gas from the primary chamber.

According to a fourth embodiment of the invention, there is provided a side curtain air bag which has chambers expanded by gas supplied from an inflator, and expands and develops in a curtain shape at side part of a vehicle so as to protect occupants. The side curtain air bag includes a primary chamber which expands so as to protect an occupant; a secondary chamber which applies tension on the side curtain air bag after the side curtain air bag is expanded and developed; and a set of strings, each having one end attached to the side curtain air bag at a joint end via the attachment part of the side curtain air bag and the other end attached to a vehicle at a fixation end, in the forward and backward direction of the vehicle. In this case, when the side curtain air bag expands and develops, the secondary chamber is disposed such that a portion or all of the secondary chamber overlaps yet another virtual band, this virtual band being defined by a first virtual line connecting the upper end of the attachment part of one tether and the fixation end of the other tether, and a second virtual line connecting respective lower ends of the attachment points of the one set of tethers.

Again, the secondary chamber may expand later than the primary chamber, and the secondary chamber may have an opening communicating with the primary chamber such that the secondary chamber may be expanded by the inflow of the gas from the primary chamber.

The air bag according to the present invention includes the primary chamber which expands to develop the air bag; the secondary chamber which applies an additional tension on the developed air bag, and the secondary chamber gradually expands later than the primary chamber is expanded. Therefore, it is possible to gradually increase the tension across the entire air bag. Accordingly, it is easy to properly control the tension of the air bag.

As a result, at the initial stage of the collision, the air bag protects the head of occupants while maintaining relatively low tension across the entire air bag so as to be soft, and at the latter stage of the collision, the air bag prevents the occupants from being thrown out of the vehicle by turnover accidents by maintaining relatively high tension across the air bag when developed to the fullest.

Further, the secondary chamber is disposed such that a portion or the entire secondary chamber overlaps a virtual band. The virtual band region may be defined by of a first virtual line connecting the respective fixation ends of the one set of tethers and a second virtual line connecting the respective joint ends of the one set of tethers; the virtual band region may also be formed of a first virtual line connecting respective upper ends of attachment points of the one set of tethers and a second virtual line connecting respective lower ends of the attachment points of the one set of tethers; and the virtual band region may be formed of a first virtual line connecting the upper end of the attachment part of one tether and the fixation end of the other tether, and a second virtual line connecting respective lower ends of the attachment points of the one set of tethers. Therefore, the tension created by the expansion of the secondary chamber, after the primary chamber is expanded and developed, is applied on the primary chamber along the virtual band region. As a result, it is possible to prevent the occupants from being thrown out of the vehicle by turnover accidents or the like by maintaining high tension of the entire air bag following initial expansion.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 2:
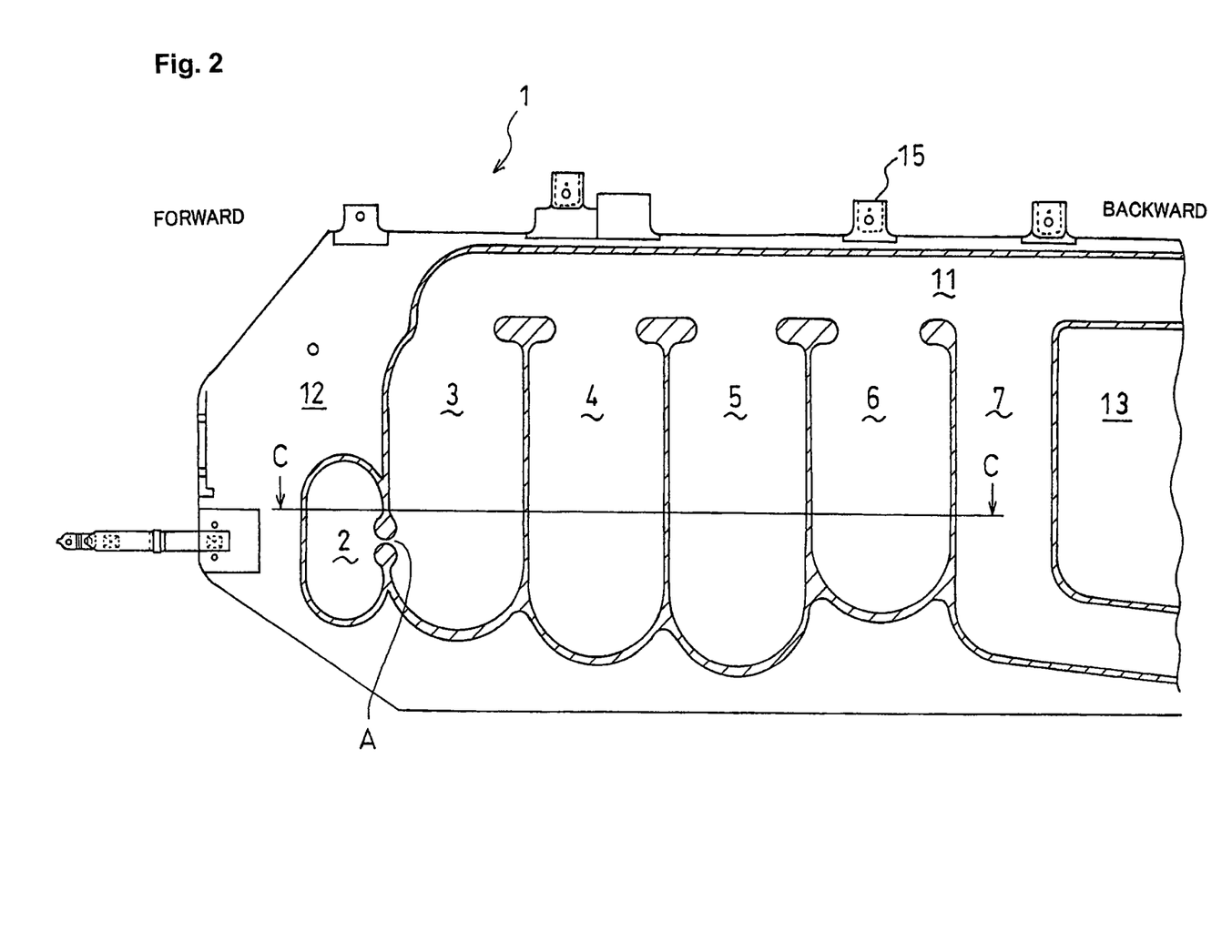
FIG. 2 is an enlarged view of main parts of the air bag according to the first embodiment of the invention.
Figure 3:
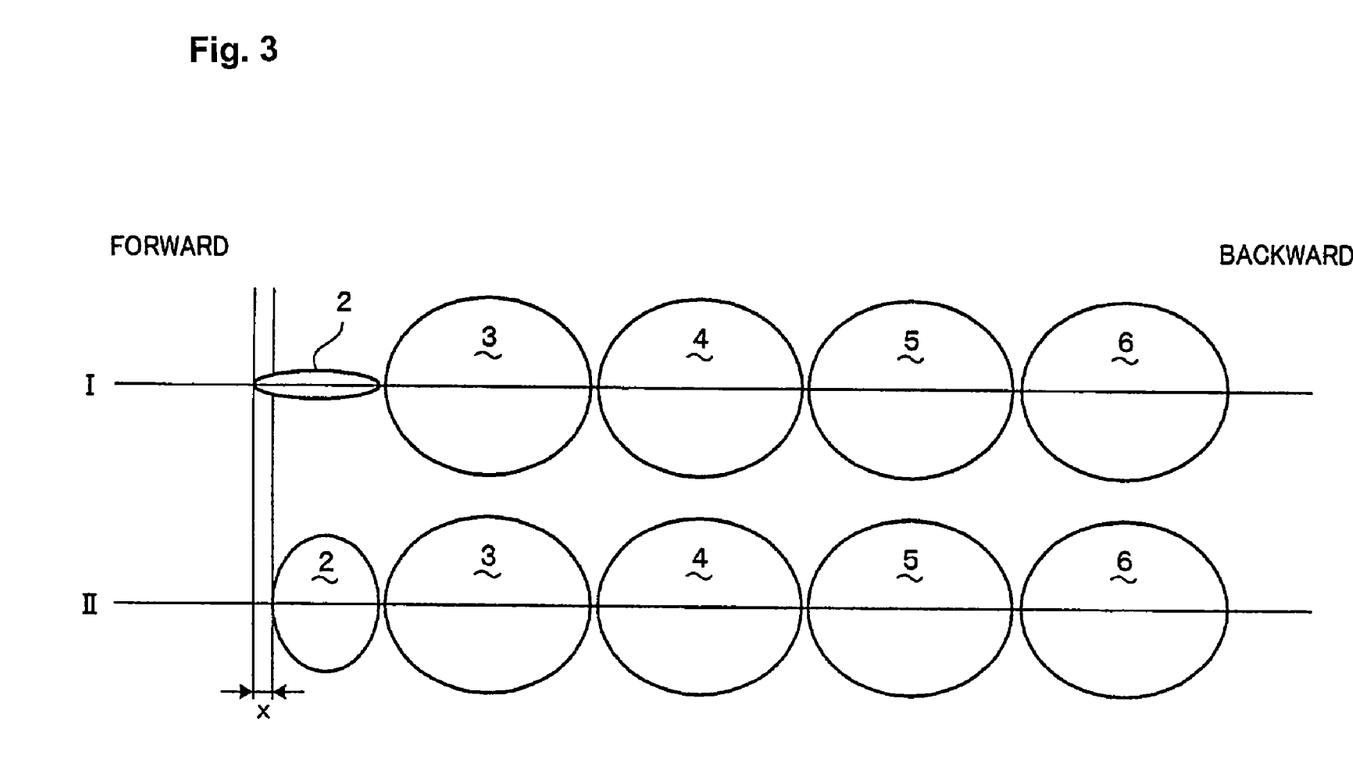
FIG. 3 is a cross-sectional view of the air bag 1 taken along the line C-C of FIG. 2.
Figure 4:
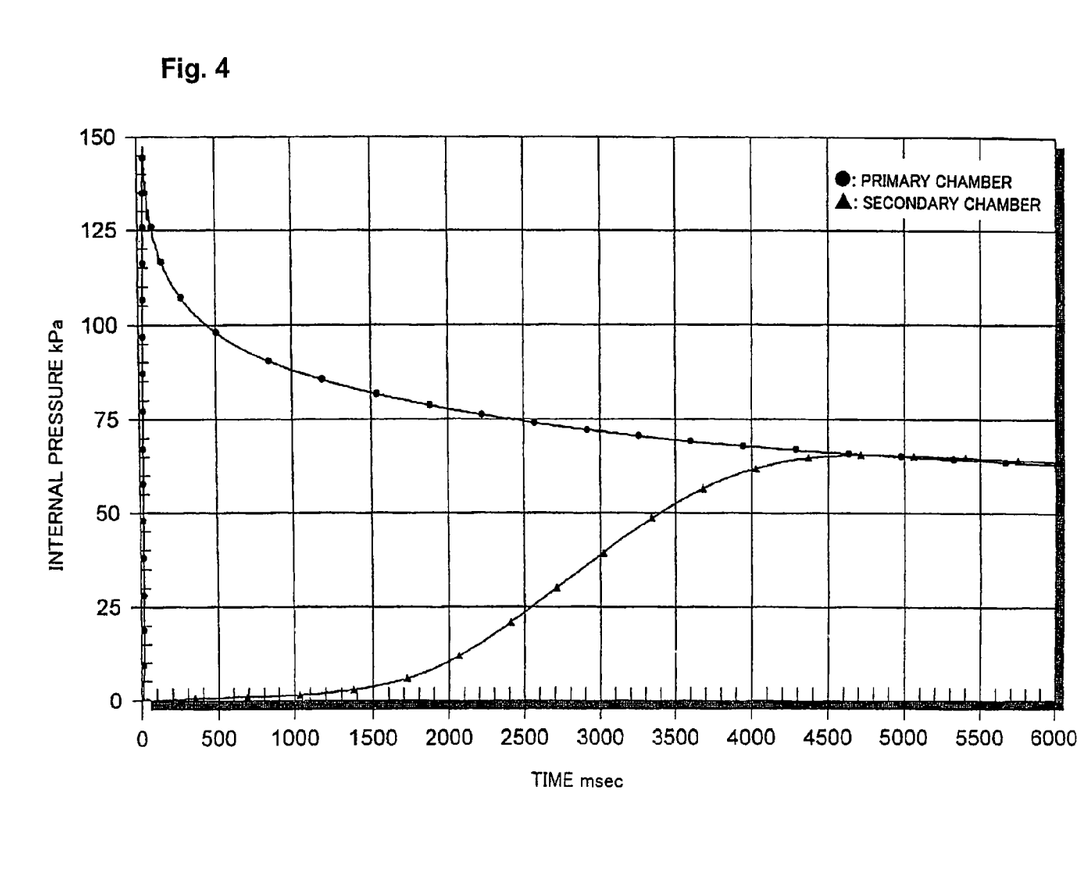
FIG. 4 is a graph showing the internal pressure change of primary and secondary chambers 3 and 2 according to the first embodiment of the invention.

An air bag 1 according to a first embodiment of the present invention will be described with reference to FIG. 1 which shows a cross-sectional view of the air bag 1. FIG. 2 is an enlarged view of the air bag 1 of FIG. 1. FIG. 3 is a cross-sectional view of the air bag 1 taken along the line C-C of FIG. 2. FIG. 4 is a graph showing the internal pressure change of primary chamber 3 and secondary chamber 2 according to the embodiment of FIG. 1.

In addition, in reference to the air bag of the present invention, the descriptions forward, backward, left, and right refer to the directions in which the air bag is attached to the inside of a vehicle as the air bag 1 expands and develops into a curtain shape.

Figure 1:
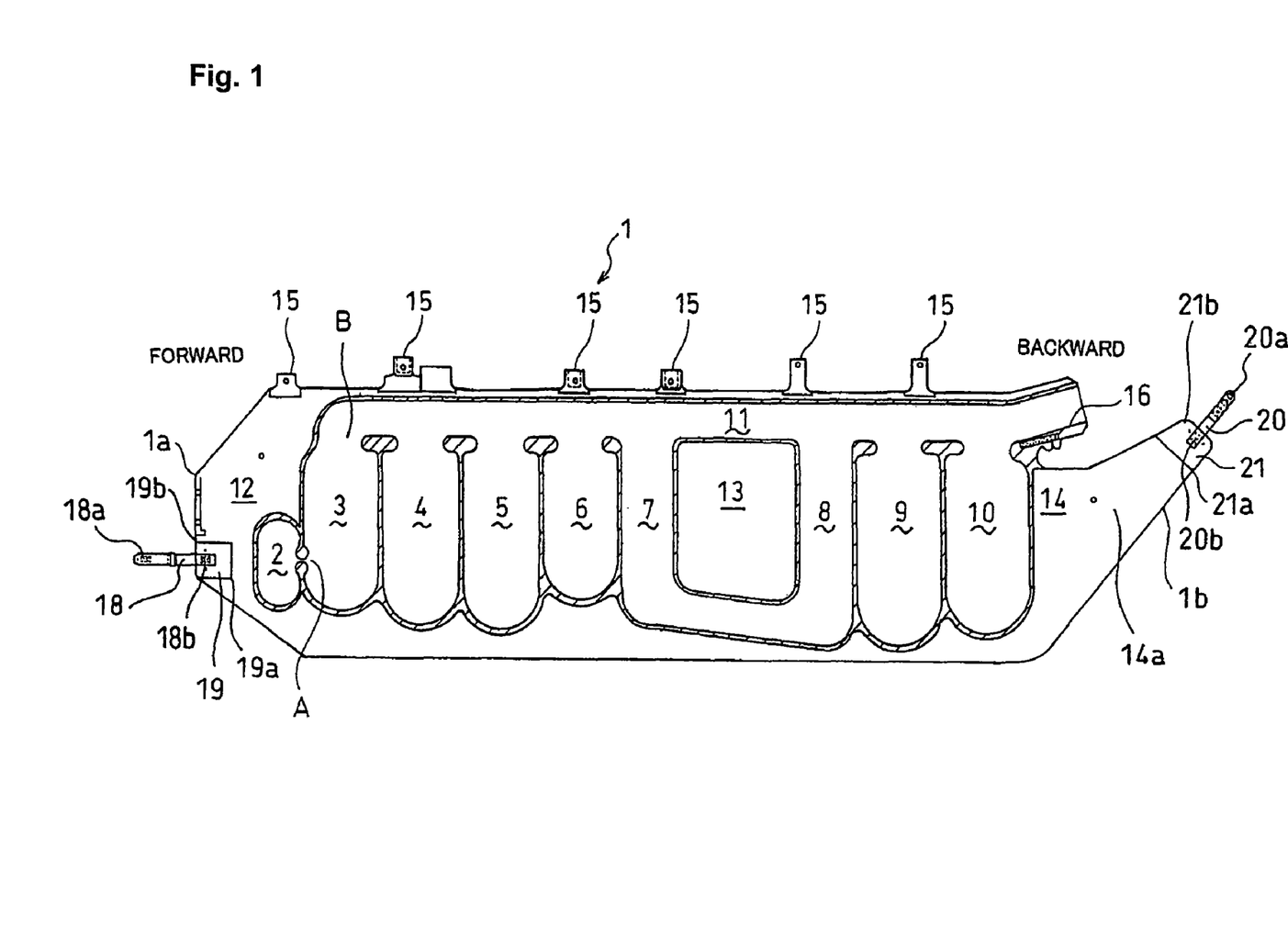
FIG. 1 is a cross-sectional view showing the entire air bag according to a first embodiment of the invention.

The air bag 1 according to a first embodiment of the present invention is a pouch-shaped air bag formed by integrally superimposing a sheet of flexible material having the section shown in FIG. 1 upon another sheet of material having a section that is a mirror image of the section shown in FIG. 1.

The air bag 1 may be formed of two sheets of material that are woven together into a predetermined pouch-shape. Otherwise, the airbag 1 may be formed of a single sheet of material that is initially woven into a pouch-shape.

As shown in FIG. 1, the air bag 1 includes a plurality of front seat inflation chambers 3, 4, 5, 6, and 7 (first through fifth chambers respectively); a plurality of back seat inflation chambers 8, 9, and 10 (sixth through eighth chambers respectively); a gas supply passage 11; a front non-inflation part 12; an intermediate non-inflation part 13; a back non-inflation part 14; a plurality of attachment tabs 15 arranged to couple to a roof side rail; a gas supply port 16; and a secondary chamber 2.

The plurality of chambers 3, 4, 5, 6, 7, 8, 9, and 10 are expanded by gas supplied from a gas generator at the time of initial collision. The chambers 3, 4, 5, 6, 7, 8, 9 and 10 when expanded by the gas function together as a primary chamber which forms the air bag as it expands and develops.

The gas supply port 16 is included on an upper trailing end of the air bag 1. The gas supply passage 11 is arranged above the chambers 3, 4, 5, 6, 7, 8, 9, and 10 so as to supply gas to the chambers 3, 4, 5, 6, 7, 8, 9, and 10 from the gas supply port 16. The chambers 3, 4, 5, 6, 7, 8, 9, and 10 are all open to the gas supply passage 11.

The secondary chamber 2 is included in front of the first chamber 3 along the forward and backward direction. The first chamber 3 is arranged in the forwardmost position of the front seat inflation part. This position results in the secondary chamber 2 applying extra tension to the air bag 1 in the forward and backward direction, when the secondary chamber 2 is expanded after than the chambers 3, 4, 5, 6, 7, 8, 9, and 10.

The secondary chamber 2, as shown in FIG. 2, has an opening A communicating with the first chamber 3 of the primary chamber such that gas of the gas generator is supplied to the secondary chamber through the first chamber 3. The size of the opening A is smaller than that of an opening B of the first chamber 3 (see FIG. 1) which communicates with the gas supply passage 11. As a result of this arrangement, the secondary chamber 2 is expanded after the primary chambers 3, 4, 5, 6, 7, 8, 9, and 10. By varying the aperture of the opening A, the time required for the secondary chamber 2 to expand can be controlled.

Referring to FIG. 1, a leading end 1a of the air bag 1 includes a first joint end 18b of a first tether 18 sewn to a first attachment point 19 that is arranged on the front non-inflation part 12. The air bag 1 is connected to a chassis of the vehicle by a first fixation end 18a of the first tether 18 that is fixed to the vehicle (not shown). A trailing end 1b of the air bag 1 includes a second joint end 20b of a second tether 20 sewn to a second attachment point 21 included on a protrusion 14a extending backward from the back non-inflation part 14. The trailing end 16 of the air bag 1 is then connected to the chassis of the vehicle by a second fixation end 20a of the second tether 20.

The first attachment point 19 and the second attachment point 21 may be made of metal, or another rigid material, that is unlikely to deform when the air bag 1 expands. However, the first attachment point 19 may also be made of deformable materials which deform expansion of the air bag 1. For example, a reinforced portion may be provided by sewing additional material to the front non-inflation part 12 to form the first attachment point 19. The first and second attachment points 19 and 21 provide a point to connect the air bag 1 to the vehicle chassis by the tethers 18 and 20. When the air bag 1 expands, significant force may be applied, requiring high strength first and second attachment points 19 and 21 to bear the tension in the tethers 18 and 20. Further, the first and second attachment points 19 and 21 include lower ends 19a and 21a and upper ends 19b and 21b.

Further, in this embodiment, a virtual band is defined between the positions of the first and second attachment points 19 and 21, across the air bag 1 from the attachment part 19 upward to the attachment part 21. In addition, the second fixation end 20a of the tether 20, which is fixed to the chassis, is located above the second attachment point 21. The first fixation end 18a of the tether 18, which is fixed to the chassis, is located substantially at the same height as the first attachment point 19. A virtual line which runs between the first and second fixation ends 20a and 18a crosses the air bag 1, as described above. The above is one example, and various modifications of the arrangement of the first and second attachment points 19 and 21 and the first and second fixation ends 20a and 18a are possible, according to the requirements of a particular application.

When using the air bag 1 of the present invention and the vehicle overturn, or collision occurs, gas of the gas generator is supplied to the gas supply port 16, and all of the primary chambers 3, 4, 5, 6, 7, 8, 9, and 10 expand and develop at the initial stage of the collision. At this time, since force that is applied on the entire air bag 1 to expand and develop the air bag 1 is continuously supplied to the secondary chamber 2 from the primary chamber 3 through the opening A, the primary chambers 3 to 10 are controlled to be applied with relatively low force, so that the air bag 1 protects the head of an occupant while the air bag 1 is softly expanding and developing. For this reason, the air bag 1 may protect the occupant without causing harm.

Next, when gas is sufficiently supplied to the secondary chamber 2 after the primary chambers expand, additional tension develops across the entire air bag 1 in the forward and backward direction. In this way, the air bag 1 having high tension protects the occupant at a latter stage of the collision or at the time of the final overturn of the vehicle. Thus, the added tension serves to keep the occupant from harm and prevent the occupant from being thrown out of the vehicle.

The method by which tension is applied across the air bag 1 due to the expansion of the secondary chamber 2 will be described with reference to FIG. 3. FIG. 3 is a cross-sectional view of the air bag 1 taken along the line C-C of FIG. 2. Reference symbol I indicates the initial stage of the collision, that is, a stage when the chambers 3, 4, 5, 6, 7, 8, 9, and 10 are completely expanded and the air bag 1 is completely developed after 0 to 100 mSec elapses from the time of detecting collision but before the secondary chamber 2 is completely expanded. Symbol II indicates the latter stage of the collision, that is, a stage when the secondary chamber 2 is completely expanded after the chambers 3, 4, 5, 6, 7, 8, 9, and 10 completely expand 4 to 6 Sec after the time of detecting the collision. Upon expansion of the secondary chamber 2, the air bag 1 shrinks in the forward and backward direction by a length x, and the additional tension is applied across the air bag 1.

FIG. 4 is a graph showing the internal pressure change of the primary and secondary chambers 3 and 2 of FIG. 1 after expansion of the air bag 1 has initiated. ● indicates the internal pressure of the primary chamber 3, and ▲ indicates the internal pressure of the secondary chamber 2. The internal pressure of the secondary chamber 2 starts to increase 1000 mSec after initiating the expansion, and becomes an identical pressure to that of the primary chamber 3 after 4500 mSec. In this way, the structure of the air bag 1 shown in FIG. 1 which permits the secondary chamber 2 to gradually expand after the primary chambers 3, 4, 5, 6, 7, 8, 9, and 10 are fully expanded, results in a gradual increase of the force for tensioning the entire air bag 1.

When the air bag 1 expands and develops, the relationship between the position of the secondary chamber 2 and the first and second attachment points 19 and 21, of the tethers 18 and 20, and the first and second fixation ends 18a and 20a of the tethers 18 and 20, plays a major role in the function of the air bag 1. This relationship will be described in FIGS. 5 to 7.

Figure 5:
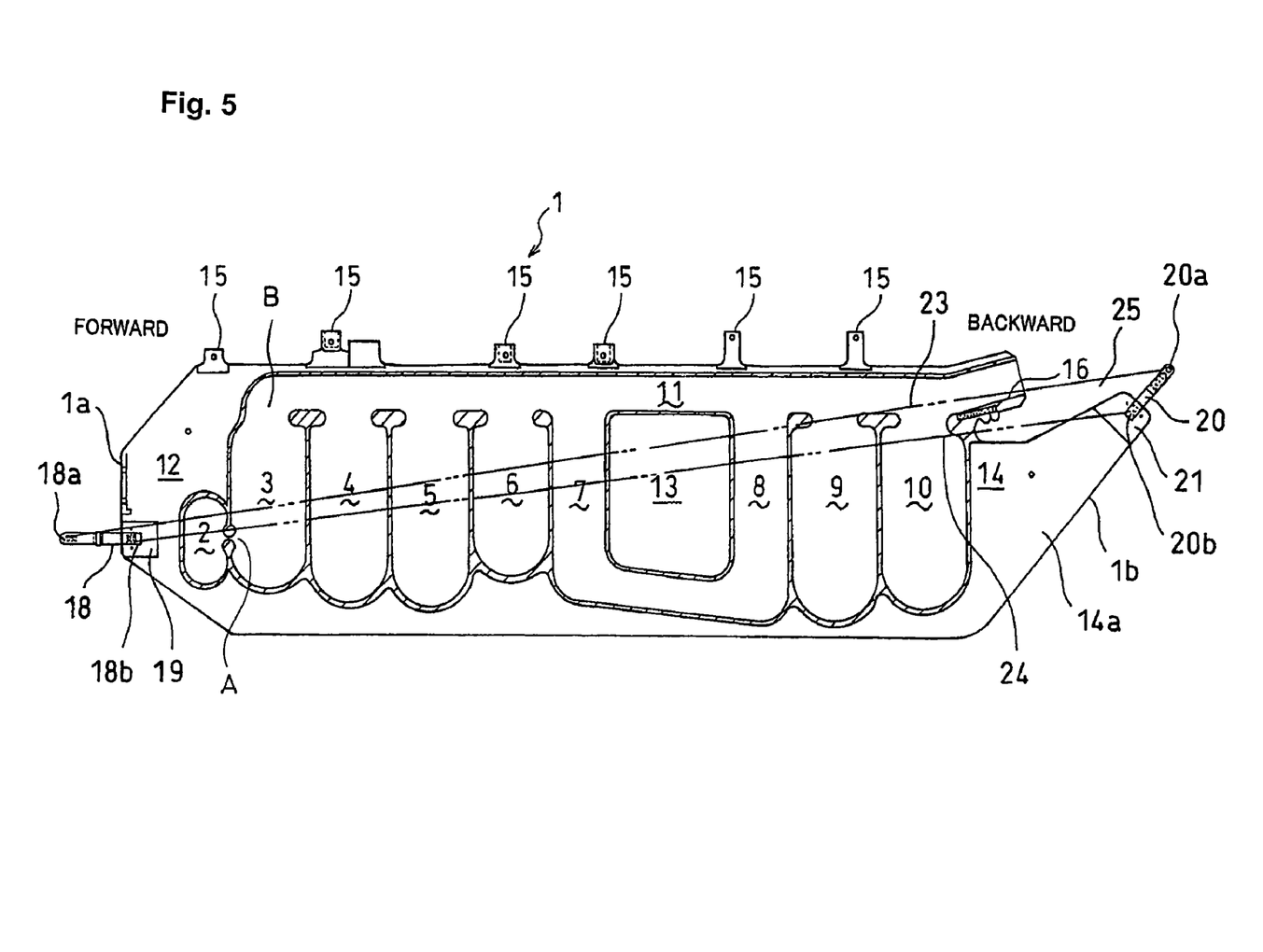
FIG. 5 is a view showing the relationship of a virtual band region and the secondary chamber.

In FIG. 5, a virtual band 25 is defined along a first virtual line 23 and a second virtual line 24, arranged such that the secondary chamber 2 is overlapped by the virtual band 25. The first virtual line 23 extends between the first fixation end 18a of the first tether 18 and the second fixation end 20a of the second tether 20. The second virtual line 24 connects the first joint 18b of the first tether 18, attached to the first attachment point 19, and the joint end 20b of the string 20, attached to the second attachment point 21. Accordingly, when gas of the gas generator is supplied to expand the air bag 1, and the secondary chamber 2 also starts to expand, tension is applied across the air bag 1 along the virtual band 25. Such increased tension makes it possible to more reliably prevent the occupant from being thrown out of the vehicle.

Figure 6:
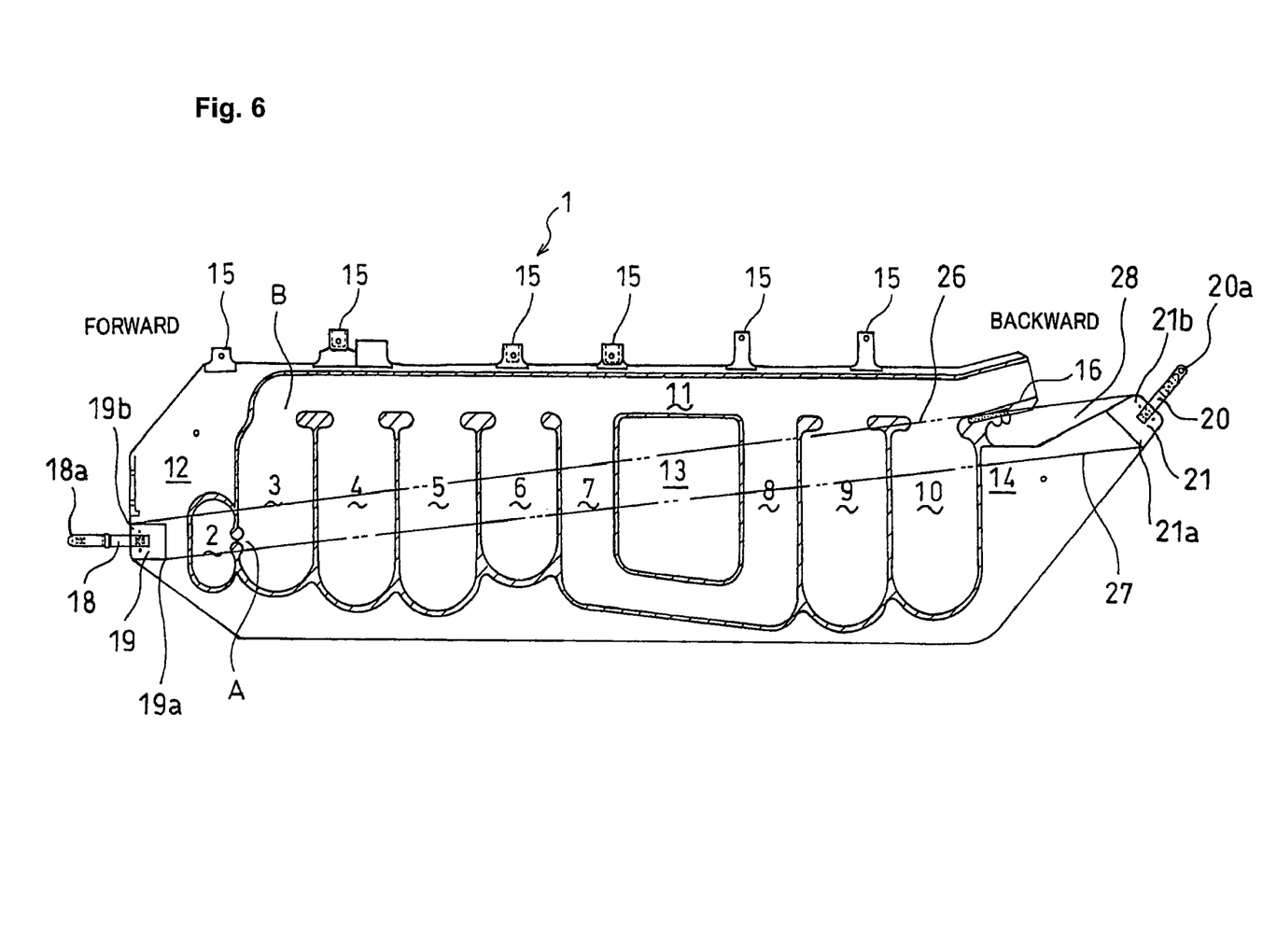
FIG. 6 is a view showing the relationship of a virtual band region and the secondary chamber.

FIG. 6 defines an alternate arrangement of a virtual band designated at 28 and configured to achieve the same effect as that of FIG. 5. In FIG. 6, the virtual band 28 is formed of a first virtual line 26 and a second virtual line 27 arranged such that the secondary chamber 2 is overlapped by the virtual band 28. The first virtual line 26 connects the upper end 19b of the first attachment point 19 with the upper end 21b of the second attachment point 21.

Likewise, the second virtual line 27 connects the lower ends 19a and 21a of their respective attachment points 19 and 21. Like the arrangement described above, when gas of the gas generator is supplied to expand the air bag 1, the secondary chamber 2 also starts to expand, causing tension to be applied across the air bag 1 along the virtual band region 28, more reliably preventing the occupant from being thrown out of the vehicle.

Figure 7:
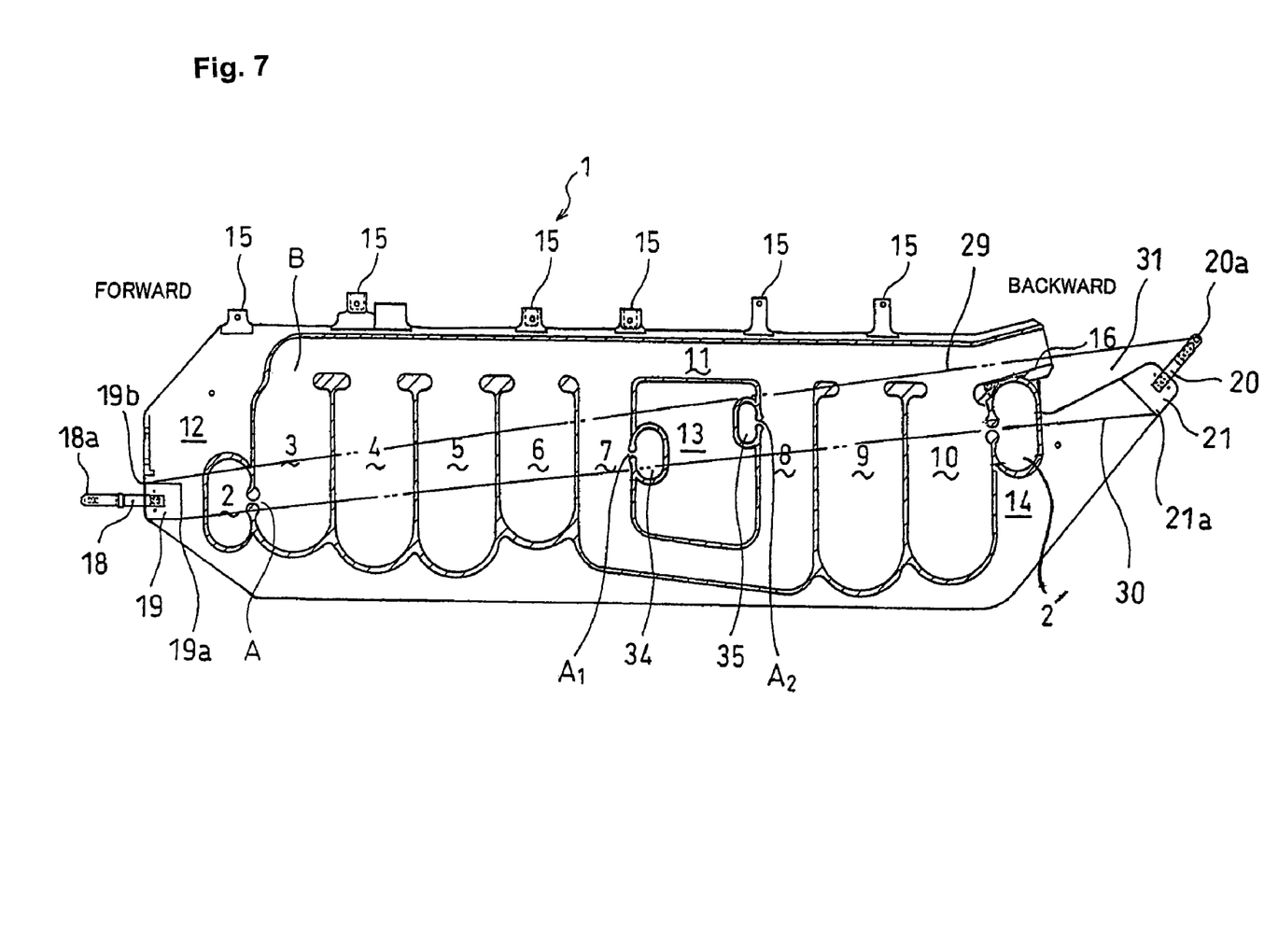
FIG. 7 is a view showing the relationship of a virtual band region and the secondary chamber according to another embodiment of the invention.

The structure of FIG. 7 shows an alternate embodiment of the present invention configured to achieve the same effect as that of FIGS. 5 and 6. In FIG. 7, another virtual band 31 is formed between a first virtual line 29 and a second virtual line 30. A plurality of secondary chambers 2, 34 and 35 are arranged to be overlapped by the virtual band 31. The first virtual line 29 connects the upper end 19b of the first attachment point 19 and the second fixation end 20a of the second tether 20. The second virtual line 30 connects the lower end 19a of the first attachment point 19 and the lower end 21a of the second attachment point 21. When gas of the gas generator is supplied to expand the air bag 1, the plurality of secondary chambers 2, 34 and 35 also start to expand, causing tension to be applied across the air bag 1 along by the virtual band region 31, and more reliably preventing the occupant from being thrown out of the vehicle.

The secondary chambers 34 and 35 of the embodiment of FIG. 7 are included in the non-inflation part 13. The secondary chamber 34 communicates with the primary chamber 7 through an opening A1, and the secondary chamber 35 communicates with the primary chamber 8 through an opening A2. The openings A1 and A2 are configured such that the respective primary chambers 34 and 35 are slower to expand than the primary chambers 7 and 8.

In addition, it is possible to omit some of the secondary chambers 2, 34 and 35 since the air bag 1 does not require all of them to achieve the tension required across the air bag 1 for a particular application. In addition, it is possible to vary the amount of time that is required for each of the secondary chambers 2, 34 and 35 to expand and develop. This allows the tension applied on the air bag 1 to be controlled over time. In addition, in other embodiments the secondary chamber 2 may be omitted, or only a portion of the secondary chamber 34 may overlap the virtual band 31 while the entire secondary chamber 35 overlaps the virtual band region 31. Tension may also be varied by properly choosing the area of the openings A, A1 and A2 of the respective secondary chambers 2, 34 and 35. Changing the above features makes it possible to configure the air bag 1 for each application in order to better insure the occupant's protection.

Figure 10:
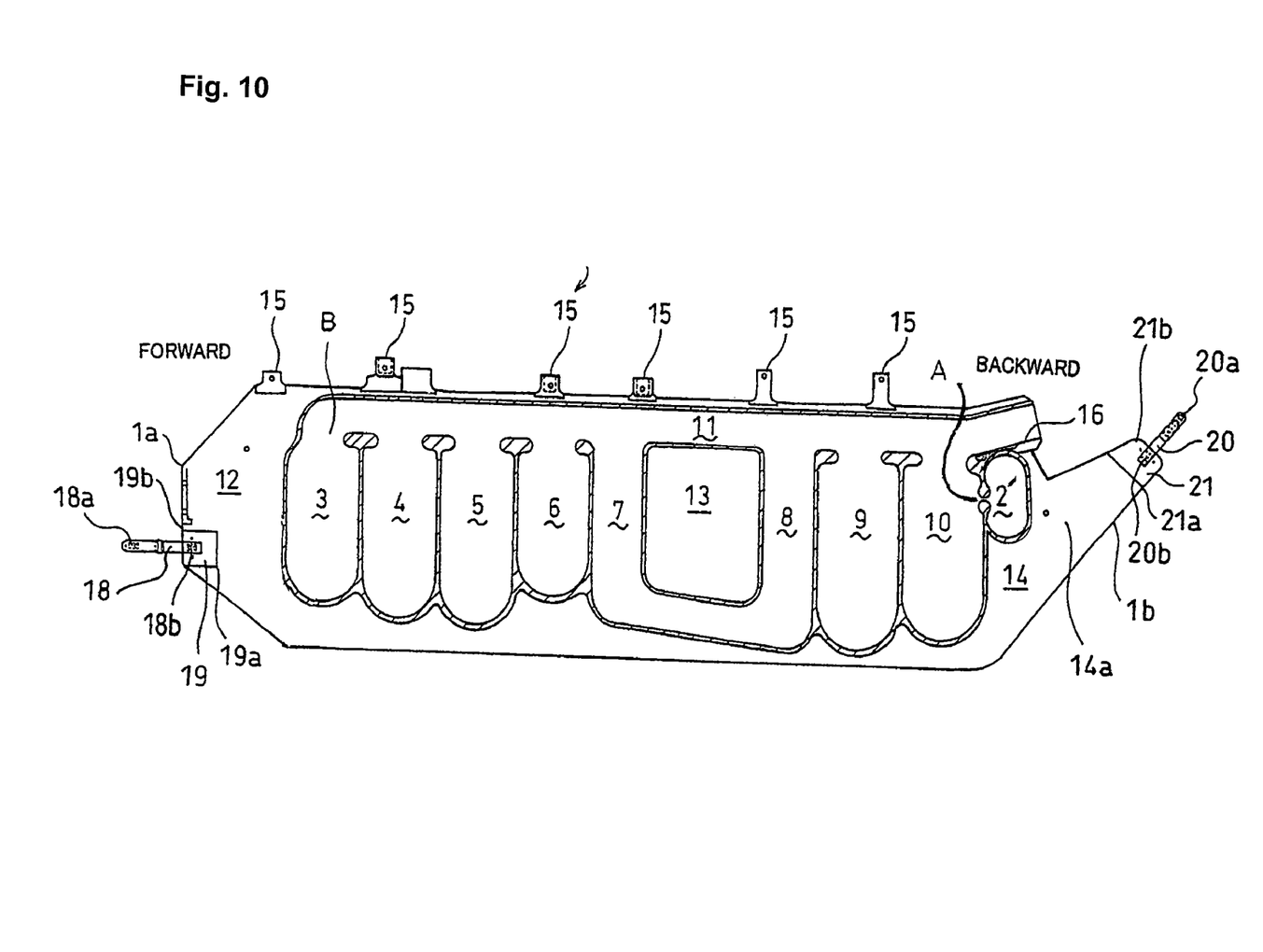
FIG. 10 is a cross-sectional view showing the entire air bag according to one other embodiment of the invention.

Further, the location of the secondary chamber 2 is not limited to the front of the primary chamber 3. For example, in some embodiments the secondary chamber 2 may be located behind the eighth chamber 10 at the rearmost end of the back seat inflation part (as shown in FIG. 7 and/or FIG. 10 as secondary chamber 2' for illustrative purposes only). In addition, it is unnecessary that gas be supplied to the secondary chamber 2 through the primary chamber. For example, gas may be supplied directly to the secondary chamber 2 from the gas supply port 16 through the gas supply passage 11.

In other words, modifications are allowed in the location and the number of the secondary chambers, and in the location and size of the opening for supplying gas to the secondary chamber as long as the secondary chamber expands later than the primary chamber and an additional tension is applied across the air bag that is developed.

Further, multiple primary and secondary chambers are not required, that is, there may be only one primary and secondary chamber respectively.

In summary, according to the present invention, the side airbag may be provided including both a chamber that is expanded by the gas of the gas generator and another chamber that expands later than the first chamber. As a result, the present invention may be applied to more reliably absorb impact on the body of a vehicle occupant.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

What is claimed is:

1. A side curtain air bag, which has chambers expanded by gas supplied from an inflator, and expands and develops in a curtain shape at side part of a vehicle so as to protect vehicle occupants, the side curtain air bag comprising:

a primary chamber which expands so as to protect an occupant;

a secondary chamber which applies tension on the side curtain air bag after the side curtain air bag is expanded and developed; and a set of tethers, each having one end attached to the side curtain air bag at a joint end and the other end attached to the vehicle at a fixation end, in a forward and backward direction of the vehicle, wherein, the primary chamber has a first opening through which gas is supplied from the inflator, and is expanded by the inflow of the gas from the inflator, the secondary chamber has a second opening through which gas is supplied from the inflator, and is expanded by the inflow of the gas from the inflator, the second opening is smaller in size than the first opening so that the secondary chamber expands later than the primary chamber, when the side curtain air bag is expanded and developed, the primary chamber and the secondary chamber are disposed such that a portion or all of the primary and secondary chambers overlap one of a virtual band region formed of a first virtual line connecting the respective fixation ends of the one set of tethers and a second virtual line connecting the respective joint ends of the one set of tethers, the virtual band region formed of the first virtual line connecting respective upper ends of attachments parts of the one set of tethers and the second virtual line connecting respective lower ends of the attachment parts of the one set of tethers, and the virtual band region formed of the first virtual line connecting the upper end of the attachment part of one tether and the fixation end of the other tether, and the second virtual line connecting the respective lower ends of the attachment parts of the one set of tethers, and the secondary chamber is, in the virtual band region, disposed in front of or behind the primary chamber in a forwardmost portion or a rearmost portion of the airbag.

2. The side curtain air bag according to claim 1 further comprising a gas supply passage formed therein extending along the forward and backward direction of the vehicle for providing fluid communication between the inflator and the primary chamber, wherein the secondary chamber is disposed further behind the primary chamber, which is a rear most chamber, and the secondary chamber and the rear most primary chamber are juxtaposed in the forward and backward direction of the vehicle.

3. The side curtain air bag according to claim 2, wherein the gas supply passage is not directly connected to the secondary chamber, and an inside of the secondary chamber is directly connected to an inside of the rear most primary chamber via the second opening.

4. The side curtain air bag according to claim 1, wherein the second opening is connected to the primary chamber, and the secondary chamber is expanded by the inflow of the gas from the primary chamber.

5. The side curtain air bag according to claim 1, wherein at an initial stage of a collision, the primary chamber expands and develops and an internal pressure of the primary chamber is maximized from the initial stage to a latter stage of the collision, the internal pressure of the primary chamber is decreased as the gas is continuously supplied to the secondary chamber and hence the secondary chamber develops; and in the latter stage of the collision, the secondary chamber develops and expands so that the internal pressure of the primary chamber becomes substantially identical with an internal pressure of the secondary chamber.

6. The side curtain air bag according to claim 5, wherein the initial stage of the collision is between 0 and 100 milliseconds after the collision is detected, and wherein the latter stage of the collision is between 4 and 6 seconds after the collision is detected.

7. A side curtain airbag, which has chambers expanded by gas supplied from an inflator, and expands and develops in a curtain shape at side part of a vehicle so as to protect vehicle occupants, the side curtain air bag comprising:
 a primary chamber which expands so as to protect an occupant;
 a secondary chamber which applies tension on the side curtain air bag after the side curtain air bag is expanded and developed; and
 a set of tethers, each having one end attached to the side curtain air bag at a joint end and the other end attached to the vehicle at a fixation end, in a forward and backward direction of the vehicle,
 wherein, the primary chamber has a first opening through which gas is supplied from the inflator, and is expanded by the inflow of the gas from the inflator,
 the secondary chamber has a second opening through which gas is supplied from the inflator, and is expanded by the inflow of the gas from the inflator,
 the second opening is smaller in size than the first opening so that the secondary chamber expands later than the primary chamber,
 when the side curtain air bag is expanded and developed, the primary chamber and the secondary chamber are disposed such that a portion or all of the primary and secondary chambers overlap one of a virtual band region formed of a first virtual line connecting the respective fixation ends of the one set of tethers and a second virtual line connecting the respective joint ends of the one set of tethers, the virtual band region formed of the first virtual line connecting respective upper ends of attachment parts of the one set of tethers and the second virtual line connecting respective lower ends of the attachment parts of the one set of tethers, and the virtual band region formed of the first virtual line connecting the upper end of the attachment part of one tether and the fixation end of the other tether, and the second virtual line connecting the respective lower ends of the attachment parts of the one set of tethers, and
 the secondary chamber protrudes into a non-inflation part of the airbag.

8. The side curtain air bag according to claim 7 further comprising a gas supply passage formed therein extending along the forward and backward direction of the vehicle for providing fluid communication between the inflator and the primary chamber, wherein the secondary chamber is disposed further behind the primary chamber, which is a rear most chamber, and the secondary chamber and the rear most primary chamber are juxtaposed in the forward and backward direction of the vehicle.

9. The side curtain air bag according to claim 8, wherein the gas supply passage is not directly connected to the secondary chamber, and an inside of the secondary chamber is directly connected to an inside of the rear most primary chamber via the second opening.

10. The side curtain air bag according to claim 7, wherein the second opening is connected to the primary chamber, and the secondary chamber is expanded by the inflow of the gas from the primary chamber.

11. The side curtain air bag according to claim 7, wherein at an initial stage of a collision, the primary chamber expands and develops and an internal pressure of the primary chamber is maximized from the initial stage to a latter stage of the collision, the internal pressure of the primary chamber is decreased as the gas is continuously supplied to the secondary chamber and hence the secondary chamber develops; and in the latter stage of the collision, the secondary chamber develops and expands so that the internal pressure of the primary chamber becomes substantially identical with an internal pressure of the secondary chamber.

12. The side curtain air bag according to claim 11, wherein the initial stage of the collision is between 0 and 100 milliseconds after the collision is detected, and wherein the latter stage of the collision is between 4 and 6 seconds after the collision is detected.

13. A side curtain air bag, which has chambers expanded by gas supplied from an inflator, and expands and develops in a curtain shape at side part of a vehicle so as to protect vehicle occupants, the side air bag comprising:
 a primary chamber which expands so as to protect an occupant;
 a secondary chamber which applies tension on the side curtain air bag after the side curtain air bag is expanded and developed; and
 a set of tethers, each having one end attached to the side curtain air bag at a joint end and the other end attached to the vehicle at a fixation end, in a forward and backward direction of the vehicle,
 wherein, the primary chamber has a first opening through which gas is supplied from the inflator, and is expanded by the inflow of the gas from the inflator,
 the secondary chamber has a second opening through which gas is supplied from the inflator, and is expanded by the inflow of the gas from the inflator,
 the second opening is smaller in size than the first opening so that the secondary chamber expands later than the primary chamber,
 when the side curtain air bag is expanded and developed, the primary chamber and the secondary chamber are disposed such that a portion or all of the primary and secondary chambers overlap one of a virtual band region formed of a first virtual line connecting the respective fixation ends of the one set of tethers, and a second virtual line connecting the respective joint ends of the one set of tethers, the virtual band region formed of the first virtual line connecting respective upper ends of attachment parts of the one set of tethers, and the second virtual line connecting respective lower ends of the attachment parts of the one set of tethers, and the virtual band region formed of the first virtual line connecting the upper end of the attachment part of one tether and the fixation end of the other tether, and the second virtual line connecting the respective lower ends of the attachment parts of the one set of tethers, and at least one secondary chamber protrudes into a front non-inflation part or a back non-inflation part of the airbag.

14. The side curtain air bag according to claim 13 further comprising a gas supply passage formed therein extending along the forward and backward direction of the vehicle for providing fluid communication between the inflator and the primary chamber, wherein the secondary chamber is disposed further behind the primary chamber, which is a rear most chamber, and the secondary chamber and the rear most primary chamber are juxtaposed in the forward and backward direction of the vehicle.

15. The side curtain air bag according to claim 14, wherein the gas supply passage is not directly connected to the secondary chamber, and an inside of the secondary chamber is directly connected to an inside of the rear most primary chamber via the second opening.

16. The side curtain air bag according to claim 13, wherein the second opening is connected to the primary chamber, and the secondary chamber is expanded by the inflow of the gas from the primary chamber.

17. The side curtain air bag according to claim 13, wherein at an initial stage of a collision, the primary chamber expands and develops and an internal pressure of the primary chamber is maximized from the initial stage to a latter stage of the collision, the internal pressure of the primary chamber is decreased as the gas is continuously supplied to the secondary chamber and hence the secondary chamber develops; and in the latter stage of the collision, the secondary chamber develops and expands so that the internal pressure of the primary chamber becomes substantially identical with an internal pressure of the secondary chamber.

18. The side curtain air bag according to claim 17, wherein the initial stage of the collision is between 0 and 100 milliseconds after the collision is detected, and wherein the latter stage of the collision is between 4 and 6 seconds after the collision is detected.

* * * * *